US012764532B2

(12) United States Patent
Guo et al.

(10) Patent No.: US 12,764,532 B2
(45) Date of Patent: Oct. 13, 2026

(54) USER EQUIPMENT AUTHENTICATION AND AUTHORIZATION PROCEDURE FOR EDGE DATA NETWORK

(71) Applicant: Apple Inc., Cupertino, CA (US)

(72) Inventors: Shu Guo, Beijing (CN); Dawei Zhang, Saratoga, CA (US); Haijing Hu, Los Gatos, CA (US); Hao Duo, Beijing (CN); Huarui Liang, Beijing (CN); Lanpeng Chen, Beijing (CN); Mona Agnel, Guildford (GB); Ralf Rossbach, Munich (DE); Sudeep Manithara Vamanan, Uttenreuth (DE); Xiaoyu Qiao, Beijing (CN)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 18/546,809

(22) PCT Filed: Feb. 19, 2021

(86) PCT No.: PCT/CN2021/076956
§ 371 (c)(1),
(2) Date: Aug. 17, 2023

(87) PCT Pub. No.: WO2022/174399
PCT Pub. Date: Aug. 25, 2022

(65) Prior Publication Data

US 2024/0137764 A1 Apr. 25, 2024
US 2024/0236675 A9 Jul. 11, 2024

(51) Int. Cl.
*H04W 12/72* (2021.01)
*H04L 9/32* (2006.01)
(Continued)

(52) U.S. Cl.
CPC ......... *H04W 12/069* (2021.01); *H04L 9/3242* (2013.01); *H04W 12/106* (2021.01); *H04W 12/71* (2021.01); *H04W 12/72* (2021.01)

(58) Field of Classification Search
CPC .... H04W 12/06; H04W 12/72; H04W 12/102
See application file for complete search history.

(56) References Cited

U.S. PATENT DOCUMENTS 10,911,934 B2 * 2/2021 Rajadurai ............... H04W 8/06
2015/0113617 A1 * 4/2015 Chastain ................ G06F 21/31
726/6

(Continued)

FOREIGN PATENT DOCUMENTS

CN 107431701 12/2017
CN 111835772 10/2020

(Continued)

*Primary Examiner* — Michael T Vu
(74) *Attorney, Agent, or Firm* — Fay Kaplun & Marcin, LLP

(57) ABSTRACT

A user equipment (UE) may attempt to access an edge data network. The UE generates a first credential based on a second credential that was generated for a procedure between the UE and a network. The UE then generates an identifier corresponding to the first credential and generates a message authentication code based on the first credential and a count, wherein the count is associated with an identifier of an edge network client running on the UE. The UE then transmits an application registration request, message to a server associated with an edge data network, the application registration request message including the count, the message authentication code, the identifier corresponding to the first credential, and a public land mobile network identifier (PLMN ID) of the network. The UE then receives an authentication accept message or an authentication reject message from the server associated with the edge data network.

8 Claims, 6 Drawing Sheets

(51) Int. Cl.

| | |
|---|---|
| ***H04W 12/069*** | (2021.01) |
| ***H04W 12/106*** | (2021.01) |
| ***H04W 12/71*** | (2021.01) |

(56) References Cited

U.S. PATENT DOCUMENTS

| | | | | |
|---|---|---|---|---|
| 2016/0154982 | A1* | 6/2016 | Velusamy | H04L 63/20 455/411 |
| 2020/0359218 | A1 | 11/2020 | Lee et al. | |

FOREIGN PATENT DOCUMENTS

| | | |
|---|---|---|
| WO | 2016/144516 | 9/2016 |
| WO | 2019/017835 | 1/2019 |
| WO | 2019/122495 | 6/2019 |
| WO | 2020/007461 | 1/2020 |
| WO | 2020/179665 | 9/2020 |
| WO | 2021/007235 | 1/2021 |

* cited by examiner

USER EQUIPMENT AUTHENTICATION AND AUTHORIZATION PROCEDURE FOR EDGE DATA NETWORK

TECHNICAL FIELD

This application relates generally to wireless communication systems, and in particular relates to user equipment authentication and authorization procedure for edge data network.

BACKGROUND

A user equipment (UE) may connect to an edge data network to access edge computing services. Edge computing refers to performing computing and data processing at the network where the data is generated. To establish a connection with the edge data network, the UE may have to perform an authentication procedure with an edge configuration server (ECS).

SUMMARY

Some exemplary embodiments are related to a user equipment (UE) having a transceiver configured to communicate with a network and a processor communicatively coupled to the transceiver. The processor is configured to perform operations. The operations include generating a first credential based on a second credential, the second credential generated for a procedure between the UE and a cellular network, generating an identifier corresponding to the first credential, generating a message authentication code based on the first credential and a count, wherein the count is associated with an identifier of an edge network client running on the UE, transmitting an application registration request message to a server associated with an edge data network, the application registration request message including the count, the message authentication code, the identifier corresponding to the first credential, and a public land mobile network identifier (PLMN ID) of the network and receiving an authentication accept message or an authentication reject message from the server associated with the edge data network.

Other exemplary embodiments are related to a network component, implementing a unified data management (UDM) of a core network. The network component includes one or more processors configured to perform operations. The operations include receiving an identifier corresponding to a user equipment (UE), a first credential, and an identifier corresponding to the first credential from an authentication server function (AUSF), receiving a mapping relationship between the identifier corresponding to the UE and the first credential and the identifier corresponding to the first credential from the AUSF, receiving an authentication verification message including a count, a message authentication code, and the identifier corresponding to the first credential from a network exposure function (NEF), determining the first credential based on the identifier corresponding to the first credential received from the NSF, verifying the message authentication code using the first credential and the count and transmitting an authentication accept message or an authentication reject message to the NEF based on the verification of the message authentication code.

Still further exemplary embodiments are related to a network component implementing a network exposure function (NEF) of a core network. The network component includes one or more processors configured to perform operations. The operations include generating a mapping relationship between an identifier associated with an edge network client running on a user equipment (UE) and an identifier associated with the UE, receiving an application registration request message from the UE, the application registration request message including the edge network client identifier, a message authentication code, and an identifier corresponding to a first credential, mapping the edge network client identifier received from the UE to the identifier associated with the UE based on the mapping relationship, transmitting a first authentication verification message to a server associated with an edge data network, the first authentication verification message including the identifier associated with the UE, the message authentication code, and the identifier corresponding to the first credential, receiving a second authentication verification message from the server, the second authentication verification message including a second identifier associated with the UE, a second message authentication code, and a second identifier corresponding to the first credential, mapping the second identifier associated with the UE to the EEC ID based on the mapping relationship and transmitting an authentication verification request message to an authentication server function (AUSF), the authentication verification request message including the edge network client identifier, the second message authentication code, and the second identifier corresponding to the first credential.

DETAILED DESCRIPTION

Figure 1:
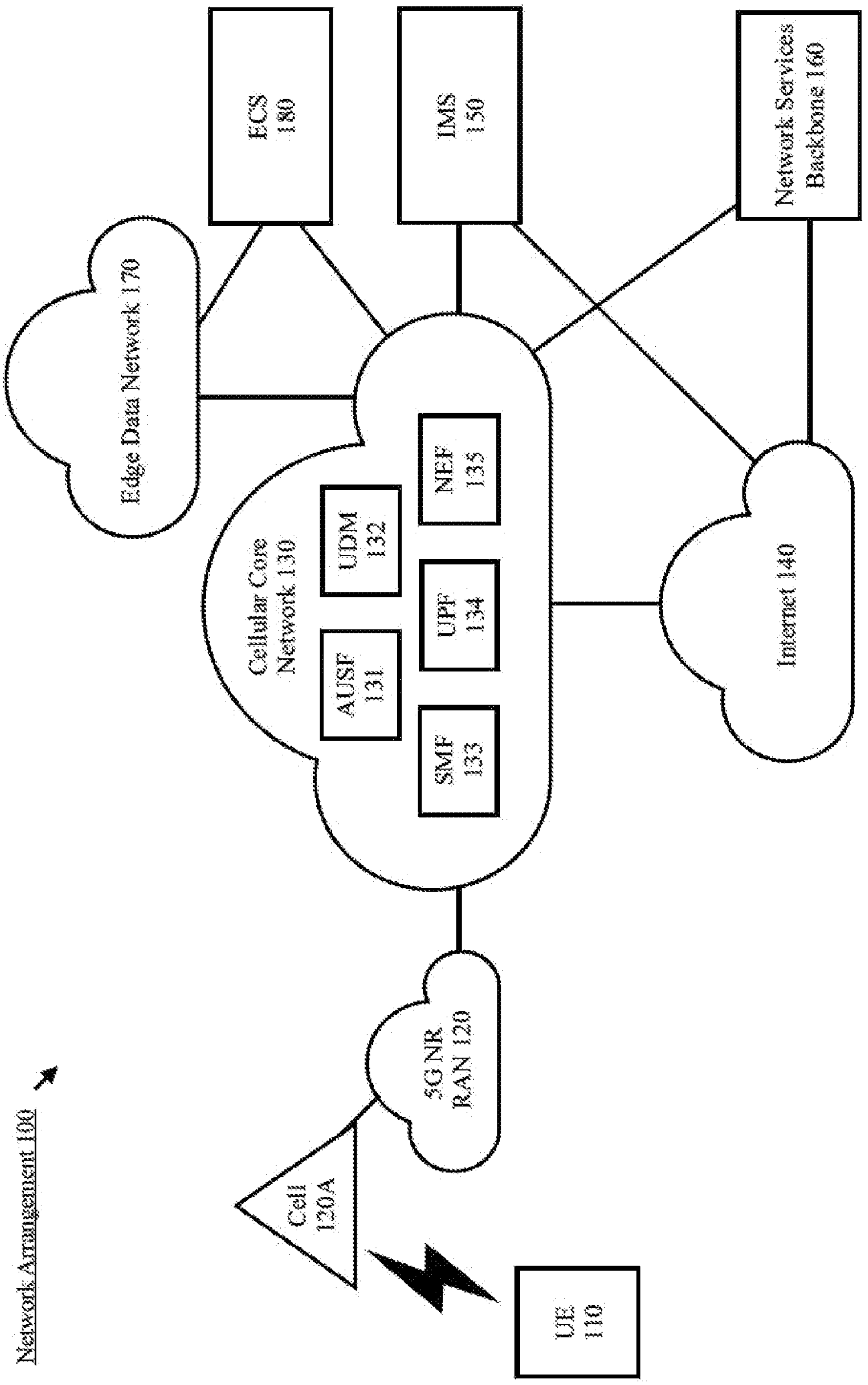
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing an authentication and authentication procedure for access to an edge data network.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NB) network. However, reference to a 5G NR network is merely provided for illustrative purposes. The exemplary embodiments may be utilized with any network that implements the functionalities described herein for edge computing. Therefore, the 5G NR network as described herein may represent any network that includes the functionalities associated with edge computing.

The UE may access an edge data network via a 5G NR network. The edge data network may provide the UE with access to edge computing services. Edge computing refers to performing computing and data processing at the network where the data is generated. In contrast to legacy approaches that utilize a centralized architecture, edge computing is a distributed approach where data processing is localized towards the network edge, closer to the end user. This allows performance to be optimized and latency to be minimized.

The exemplary embodiments are further described with regard to an edge configuration server (ECS). The ECS may perform operations related to the authentication and authorization procedure for access to an edge data network. However, reference to an ECS is merely provided for illustrative purposes. The exemplary embodiments may be utilized with any electronic component that is configured with the hardware, software, firmware and/or cloud computing functionality to exchange information with the UE. Therefore, the ECS as described herein is used to represent any appropriate electronic component or function resident in the network.

When performing authentication with an edge data network the UE may include an edge enabler client. ID (EEC ID) specific to the UE in the registration request. However, an attacker may maliciously intercept the message from the UE and obtain the EEC ID to track the UE.

In some exemplary embodiments, the UE is configured to protect its EEC ID by using a count (instead of its EEC ID) that may or may not be related to its EEC ED in communications with the edge data network. As a result, the EEC ID is never shared outside of the UE, substantially reducing the risk of this ID being maliciously obtained.

In other exemplary embodiments, a network exposure function (NEF) of the mobile network operator (MNO) network is configured to map a public ID of the UE to the EEC ID. The public ID of the UE is used in communications with the edge data network so that the EEC ID is never communicated outside of the MNO network, substantially reducing the risk of this ID being maliciously obtained.

FIG. 1 shows an exemplary network arrangement 100 according to various exemplary embodiments. The exemplary network arrangement 100 includes UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-MI devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, an LIE RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, Sprint, I-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR. RAN 120 includes a cell 120A that represents a gNB. However, an actual network arrangement may include any number of different types of cells being deployed by any number of RANs. Thus, the example of a single cell 120A is merely provided for illustrative purposes.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cells 120A). However, as mentioned above, reference to the 5G NR-RAN 120 is merely for illustrative purposes and any appropriate type of RAN may be used.

The network arrangement 100 also includes a cellular core network 130. The cellular core network 130 may be considered to be the interconnected set of components or functions that manage the operation and traffic of the cellular network. In this example, the components include an authentication server function (AUSF) 131, a unified data management (UDM) 132, a session management function (SMF) 133, a user plane function (UPF) 134 and network exposure function (NEF) 135. However, an actual cellular core network may include various other components performing any of a variety of different functions.

The AUSF 131 may store data for authentication of UEs and handle authentication-related functionality. The AUSF 131 may be equipped with one or more communication interfaces to communicate with other network components (e.g., network functions, RANs, UEs, etc.). The exemplary embodiments are not limited to a AUSF that performs the above reference operations. Those skilled in the art will understand the variety of different types of operations a. AUSF may perform. Further, reference to a single AUSF 131 is merely for illustrative purposes, an actual network arrangement may include any appropriate number of AUSFs.

The UDM 132 may perform operations related to handling subscription-related information to support the network's handling of communication sessions. The UDM 132 may be equipped with one or more communication interfaces to communicate with other network components (e.g., network functions, RANs, UEs, etc.). The exemplary embodiments are not limited to an UDM that performs the above reference operations. Those skilled in the art will understand the variety of different types of operations a UDM may perform. Further, reference to a single UDM 132 is merely for illustrative purposes, an actual network arrangement may include any appropriate number of UDMs.

The SMF 133 performs operations related to session management such as, but not limited to, session establishment, session release, IP address allocation, policy and quality of service (QoS) enforcement, etc. The SMF 133 may be equipped with one or more communication interfaces to communicate with other network components (e.g., network functions, RANs, UEs, etc.). The exemplary embodiments are not limited to an SMF that performs the above reference operations. Those skilled in the art will understand the variety of different types of operations a. SMF may perform. Further, reference to a single SMF 133 is merely for illustrative purposes, an actual network arrangement may include any appropriate number of SMFs.

The UPF 134 performs operations related packet data unit (PDU) session management. For example, the UPF 134 may facilitate a connection between the UE 110 and the edge data network 170. The UPF 134 may be equipped with one or more communication interfaces to communicate with other networks and/or network components (e.g., network functions, RANs, UEs, etc.). The exemplary embodiments are not limited to an UPF that performs the above reference operations. Those skilled in the art will understand the variety of different types of operations an UPF may perform. Further, reference to a single UPF 134 is merely for illustrative purposes, an actual network arrangement may include any appropriate number of UPFs.

The NEF 135 is generally responsible for securely exposing the services and capabilities provided by 5G NR-RAN 120 network functions. The NEF 135 may be equipped with one or more communication interfaces to communicate with other network components (e.g., network functions, RANs, UEs, etc.). The exemplary embodiments are not limited to a NEF that performs the above reference operations. Those skilled in the art will understand the variety of different types of operations a NEF may perform. Further, reference to a single NEF 135 is merely for illustrative purposes, an actual network arrangement may include any appropriate number of NEFs.

The network arrangement 100 also includes the Internet 140, an IP Multimedia Subsystem (IMS) 150, and a network services backbone 160. The cellular core network 130 manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that, implement a suite of services that, may be used to extend the functionalities of the UE 110 in communication with the various networks.

In addition, the network arrangement 100 includes an edge data network 170 and an edge configuration server (ECS) 180. The exemplary embodiments are described with regard to implementing an authentication and authorization procedure between the UE 110 and the ECS 180. The edge data network 170 and an ECS 180 will be described in more detail below with regard to FIG. 3.

Figure 2:
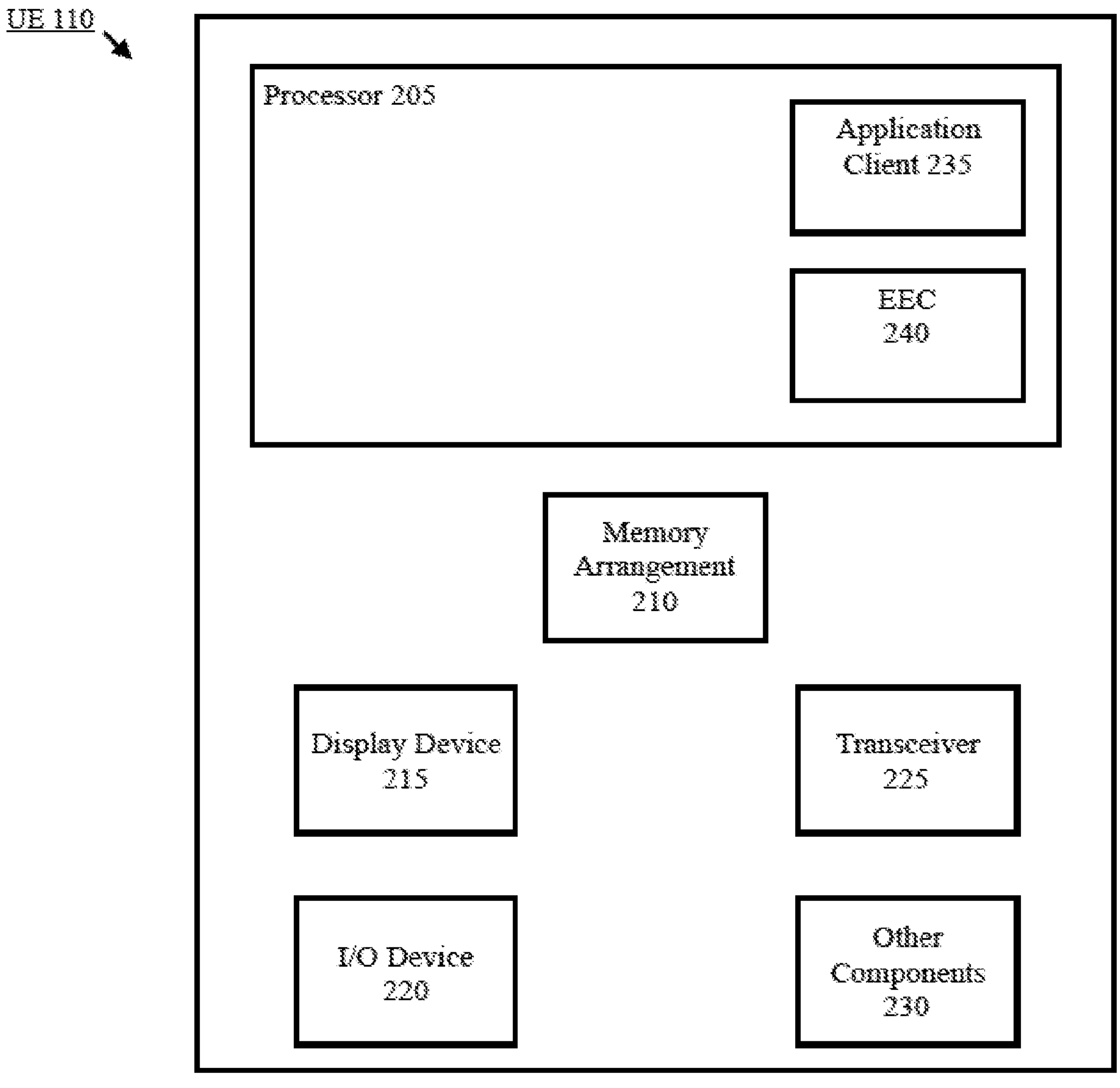
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/C) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute various types of software. For example, the processor may execute an application client 235 and an edge enabler client (EEC) 240. The application client 235 may perform operations related to an application running on the UE 110 exchanging application data with a server via a network. The EEC 240 may perform operations related to establishing a connection to the edge data network 170. The application client 235 and the EEC 240 are discussed in more detail below with regard to FIG. 4.

The above referenced software being executed by the processor 205 is only exemplary. The functionality associated with the software may also be represented as a separate incorporated component of the UE 110 or may be a modular component coupled to the UE 110, e.g., an integrated circuit with or without firmware. For example, the integrated circuit may include input, circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a. UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
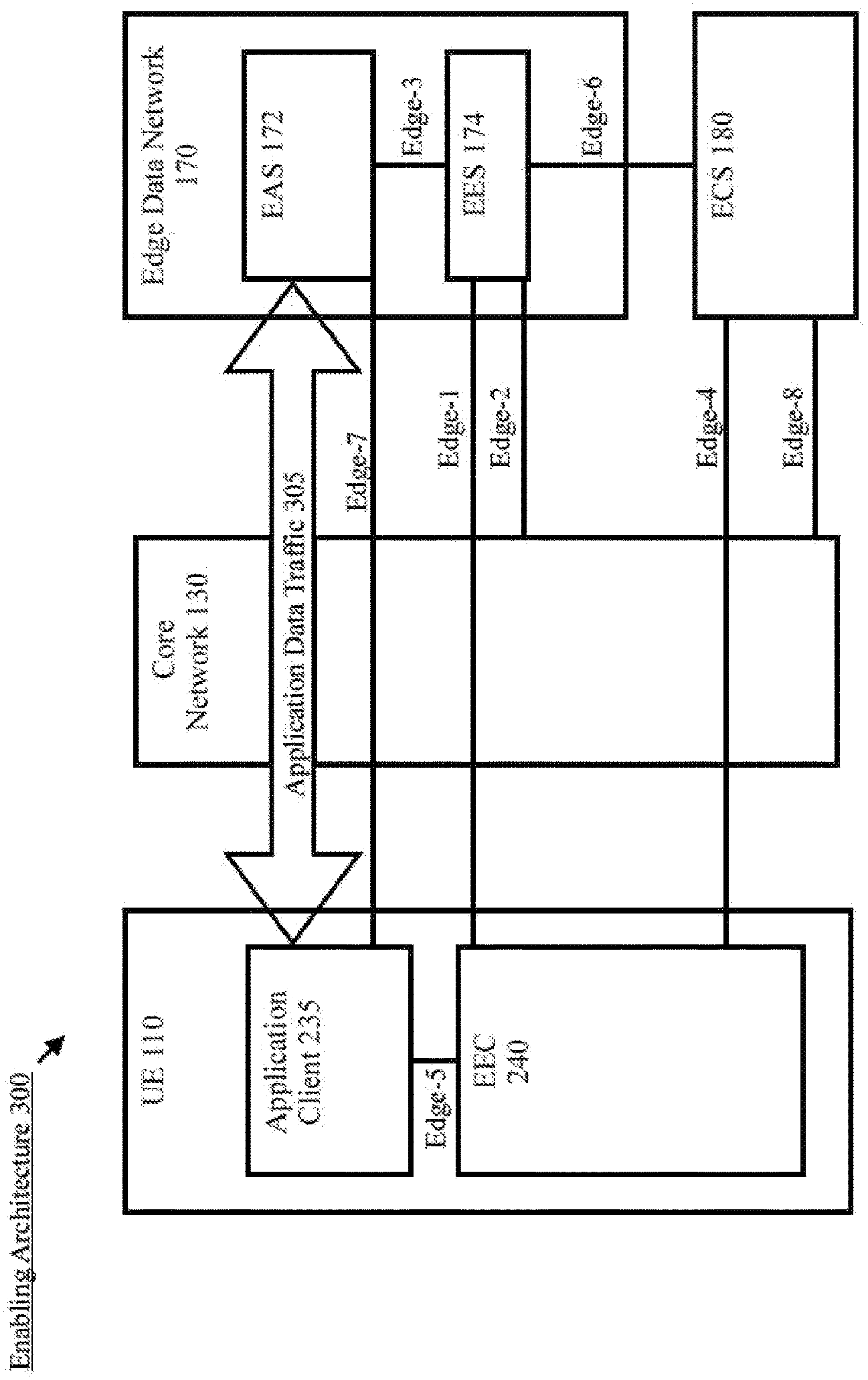
FIG. 3 shows an architecture for enabling edge applications according to various exemplary embodiments.

FIG. 3 shows an architecture 300 for enabling edge applications according to various exemplary embodiments. The architecture 200 will be described with regard to the network arrangement 100 of FIG. 1.

The exemplary embodiments will be described with regard to an authentication and authorization procedure between the EEC 240 of the UE 110 and the ECS 180. Successful completion of the exemplary procedure may precede the flow of application data traffic between the edge data network 170 and the UE 110. The architecture 300 provides a general example of the type of components that may interact with one another when the UE 110 is configured to exchange application data traffic with the edge data network 170. A specific example of the exemplary authentication and authorization procedure will be provided below with regard to the signaling diagram 400 of FIG. 4.

The architecture 300 includes the UE 110, the core network 130 and the edge data network 170. The UE 110 may establish a connection to the edge data network 170 via the core network 130 and various other components (e.g., cell 120A, the 5G NR RAN 120, network functions, etc.).

In the architecture 300, the various components are shown as being connected via reference points labeled edge-x (e.g., edge-1, edge-2, edge-3, edge-4, edge-5, edge-6, edge-7, edge-8, etc.). Those skilled in the art will understand that each of these reference points (e.g., connections, interfaces, etc.) are defined in the 3GPP Specifications. The exemplary architecture arrangement 300 is using these reference points in the manner in which they are defined in the 3GPP Specifications. Furthermore, while these interfaces are termed reference points throughout this description, it should be understood that these interfaces are not required to be direct wired or wireless connections, e.g., the interfaces may communicate via intervening hardware and/or software components. To provide an example, the UE 110 exchanges communications with the gNB 120A. However, in the architecture 300 the UE 110 is shown as having a connection to the ECS 180. However, this connection is not a direct communication link between the UE 110 and the ECS 180. Instead, this is a connection that is facilitated by intervening hardware and software components. Thus, throughout this description the terms "connection," "reference point" and "interface" may be used interchangeably to describe the interfaces between the various components in the architecture 300 and the network arrangement 100.

During operation, application data traffic 305 may flow between the application client 235 running on the UP 110 and the edge application server (EAS) 172 of the edge data network 170. The EAS 172 may be accessed through the core network 130 via uplink classifiers (CL) and branching points (NP) or in any other appropriate manner. Those skilled in the art will understand the variety of different types of operations and configurations relevant to an application client and an EAS. The operations performed by these components are beyond the scope of the exemplary embodiments. Instead, these components are included in the description of the architecture 300 to demonstrate that the exemplary authentication and authorization procedure between the UE 110 and the ECS 180 may precede the flow of application data traffic 305 between the UE 110 and the edge data network 170.

The EEC 240 may be configured to provide supporting functions for the application client 235. For example, the EEC 240 may perform operations related to concepts such as, but not limited to, the discovery of EASs that are available in an edge data network (e.g., EAS 172) and the retrieval and provisioning of configuration information that may enable the exchange of the application data traffic 305 between the application client 235 and the EAS 172. To differentiate the EEC 240 from other PECs, the EEC 240 may be associated with a globally unique value (e.g., EEC ID) that identifies the EEC 240. Further, reference to a single application client 235 and EEC 240 is merely provided for illustrative purposes, the UE 110 may be equipped with any appropriate number of application clients and EECs.

The edge data network 170 may also include an edge enabler server (EES) 174. The EES 174 may be configured to provide supporting functions to the EAS 172 and the EEC 240 running on the UE 110. For example, the EES 174 may perform operations related to concepts such as, but not limited to, provisioning configuration to enable the exchange of the application data traffic 305 between the UE 110 and the EAS 172 and providing information related to the EAS 172 to the EEC 240 running on the UE 110. Those skilled in the art will understand the variety of different, types of operations and configurations relevant to an EES. Further, reference to the edge data network 170 including a single EAS 172 and a single EES 174 is merely provided for illustrative purposes. In an actual deployment scenario, an edge data network may include any appropriate EASs and EESs interacting with any number of UEs.

The ECS 180 may be configured to provide supporting functions for the EEC 240 to connect to the EES 174. For example, the ECS 180 may perform operations related to concepts such as, but not limited to, provisioning of edge configuration information to the EEC 240. The edge configuration information may include the information for the EEC 240 to connect to the EES 174 (e.g., service area information, etc.) and the information for establishing a connection with the EES 174 (e.g., uniform resource identifier (URI). Those skilled in the art will understand the variety of different types of operations and configurations relevant to an ECS.

In the network architecture 100 and the enabling architecture 300, the ECS 180 is shown as being outside of the edge data network 170 and the core network 130. However, this is merely provided for illustrative purposes. The ECS 180 may be deployed in any appropriate virtual and/or physical location (e.g., within the mobile network operator's domain or within a third party domain) and implemented via any appropriate combination of hardware, software and/or firmware.

As indicated above, the interaction between the ECS 180 and the EEC 240 running on the UE 110 may occur prior to the flow of the application data traffic 305. The exemplary embodiments relate to an authentication and authorization procedure between the UE 110 and the ECS 180.

Figure 4A:
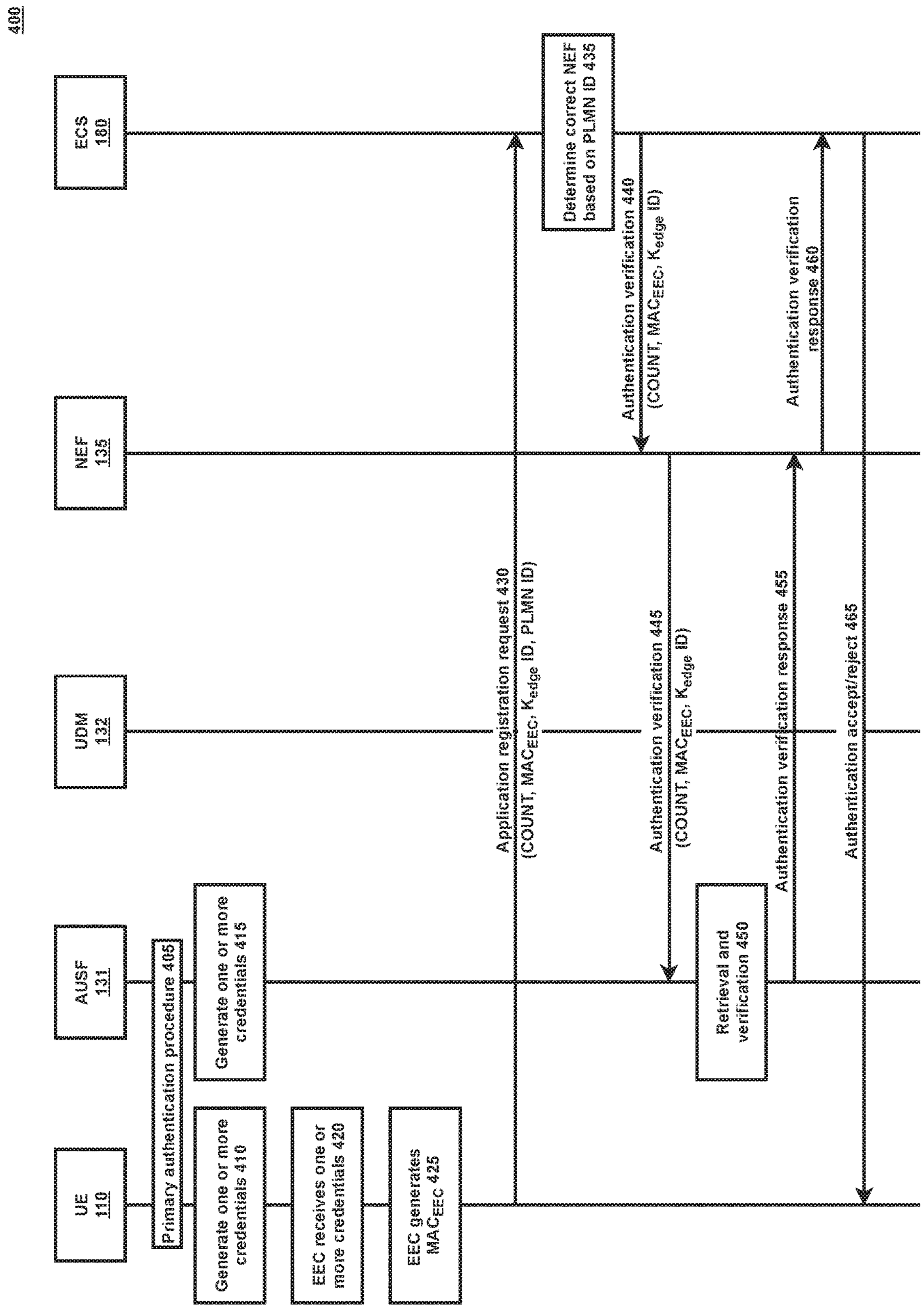
FIGS. 4*a* and 4*b* show signaling diagrams for an authentication and authorization procedure according to various exemplary embodiments.

FIG. 4A shows a signaling diagram 400 for an authentication and authorization procedure according to various exemplary embodiments. The signaling diagram 400 will be described with regard to the enabling architecture 300 of FIG. 3, the UE 110 of FIG. 2 and the network arrangement 100 of FIG. 1.

The signaling diagram 400 includes the UE 110, the AUSF 131, the UDM 132, the NEF 135, and the ECS 180. As will be described in more detail below, the credentials generated by primary authentication procedure (e.g., $K_{AUSF}$) may provide the basis for the for credentials of the exemplary authentication and authorization procedure described herein.

Those skilled in the art will understand that the primary authentication procedure (e.g., 5G AKA, EAP-AKA, etc.) generally refers to an authentication procedure between the UE 110 and the core network 130. During the procedure, the AUSF 131 may generate a credential $K_{AUSF}$ via authentication vector generation. The $K_{AUSF}$ may then be used for further operations of the primary authentication procedure. Some characteristics of the $K_{AUSF}$ include i) the $K_{AUSF}$ may be shared between the UE 110 and AUSF of the home public land mobile network (HPLMN) (e.g., AUSF 131) and ii) the $K_{AUSF}$ may provide the basis of the subsequent 5G key hierarchy.

The signaling diagram 400 assumes that the UE 110 and the core network 130 have already successfully performed the primary authentication procedure and the credential ($K_{AUSF}$) is available. However, reference to $K_{AUSF}$ is merely provided for illustrative purposes, the exemplary embodiments may apply to any similar type of 3GPP credential or information being used in addition or instead of $K_{AUSF}$.

In addition, for the purposes of the signaling diagram 400, it may be considered that the credentials generated by primary authentication cannot be sent outside of the carrier's network. Further, it may also be considered that the UE 110 has already discovered the edge data network 170 and is permitted to initiate this exemplary edge computing authentication and authorization procedure.

In 405, the UE 110 performs primary authentication with the network. As indicated above, the procedure may result in the credential ($K_{AUSF}$) being shared between the UE 110 and the AUSF 131. However, the exemplary embodiments are not limited to the use of $K_{AUSF}$, any other appropriate parameters may be utilized.

In 410, the UE 110 generates and stores one or more credentials. Throughout this description, these credentials may be referred to as "$K_{edge}$" and "$K_{edge}$ID." However, reference to "$K_{edge}$" and "$K_{edge}$ID" is me rely for illustrative purposes, any appropriate credentials or parameters may be utilized.

In this example, the credential $K_{edge}$ may be generated using a key derivation function (KDF). Those skilled in the art will understand that the KDF may be, for example, the KDF defined in Annex B.2.0 of 3GPP Technical Specification (TS) 33.220 or any other similar type of function.

The credential $K_{edge}$ may be derived from credential $K_{AUSF}$. For example, the input key for the KDF may be the $K_{AUSF}$. When deriving $K_{edge}$, the following parameters may also be used for the KDF: FC, P0, L0. Here, FC may represent a parameter used to distinguish between different instances of the KDF. The value for FC may be any appropriate value allocated by a 3GPP based entity. The Subscription permanent identifier (SUPI) or any other identifier associated with the UE 110 (e.g., generic public subscription identifier (GPSI), etc.) may be used for P0. The length of the P0 parameter (e.g., SUPI, GPSI, etc.) may be used for L0.

The $K_{edge}$ID parameter may be used to uniquely identify a $K_{edge}$ parameter. The $K_{edge}$ID parameter may be generated in any appropriate manner. As described above, it may be considered that the credentials generated by primary authentication cannot be sent outside of the carrier's network. Thus, the $K_{edge}$ may not be sent outside of the carrier network. However, the $K_{edge}$ID parameter may be sent outside the network since it is not a credential but rather a parameter that, uniquely identifies the $K_{edge}$ID parameter.

In 415, the AUSF 131 generates and stores one or more credentials. Here, the AUSF 131 generates the same credentials generated by the UE 110 in a similar manner as in 410. Thus, in this example, the AUSF 131 may also generate the credentials $K_{edge}$ and $K_{edge}$ID. Since the credential $K_{AUSF}$ is shared between the UE 110 and the AUSF 131, the UE 110 and the AUSF 131 may independently generate the same credentials. However, reference to $K_{AUSF}$ is merely provided for illustrative purposes, any appropriate type of information may be used to provide the basis for the one or more credentials generated in 410 and 415. For example, in some embodiments, In 420, the EEC 240 receives the one or more credentials generated by the UE 110. For example, the EEC 240 may retrieve $K_{edge}$ and $K_{edge}$ID from the memory arrangement 210 of the UE 110 or these credentials may be provided to the EEC 240 by another process executed by the processor 205.

In 425, the EEC 240 may generate a message authentication code (MAC) EEC authorization parameter. Throughout this description, this parameter may be referred to as $MAC_{EEC}$. The authorization parameter may be generated using $K_{edge}$ and a count, parameter (COUNT). For example, the $MAC_{EEC}$ parameter may be generated using the SHA-256 hashing function. When deriving the $MAC_{EEC}$ parameter, P0 and P1 may be used to form the input parameter S. Here, P0 represents $K_{edge}$ and P1 represents the COUNT. The input S may be equal to the concatenation P0||P1. The $MAC_{EEC}$ parameter is identified with the N least significant bits of the output of the SHA-246 function, e.g., 32 bits, 64 bits, etc.

In some embodiments, the COUNT may be a randomly generated number. In some embodiments, the COUNT may alternatively correspond to an EEC ID associated with the EEC 240. For example, the UE 110 may be configured to map the COUNT to the EEC ID such that the count may be shared with other entities (e.g., the edge data network) but the EEC ID is never shared outside of the UE 110. In some embodiments, the UE 110 may include a plurality of EEC IDs. In such a scenario, the UE 110 is configured to map a plurality of COUNT to a corresponding plurality of EEC IDs. To ensure the EEC ID is secured within the UE 110, the UE 110 does not share the mapping relationship between the COUNT(s) and the EEC ID(s). In some embodiments, the UE 110 may change the COUNT after it is used a predetermined number of times. In such a scenario, when the COUNT is changed, the mapping of the COUNT to the corresponding EEC ID is also updated. The UE 110 is configured to generate the COUNT in an unpredictable, random manner such that the EEC ID maintained within the UE 110 is secured.

In 430, the UE 110 sends an application registration request to the ECS 180. The application registration request may include information such as, but not limited to, COUNT, $MAC_{EEC}$ the $K_{edge}$ID, and the PLMN ID of the network serving the UE 110. This message may be sent, via non-access stratum (NAS), the user plane or in any other appropriate manner.

In 435, the ECS 180 determines the correct NEF (e.g., NEF 135) associated with the UE 110 based on the received PLMN ID. In 440, the ECS 180 sends an authentication verification message to the NEF 135 for verification. The authentication verification message may include contents similar to the application registration request (e.g., COUNT, $MAC_{EEC}$ and the $K_{edge}$ID).

In 445, the NEF 135 may send an authentication verification message to the AUSF 131 for $MAC_{EEC}$ verification. In 450, the AUSF 131 may retrieve $K_{edge}$ using the $K_{edge}$ID and may verify the $MAC_{EEC}$ using the $K_{edge}$ and the COUNT. In other words, the AUSF 131 may verify the received $MAC_{EEC}$ by retrieving the credential generated in 410 based on its stored association to $K_{edge}$ID. In some embodiments, the AUSF 131 may then generate a second, independent and distinct, instance of $MAC_{EEC}$. If the second instance of $MAC_{EEC}$ matches the $MAC_{EEC}$ received in 445, the verification process is a success. In this example, the verification process is a success. However, in an actual operating scenario, if a stored instance of $K_{edge}$ cannot be found or the second instance of $MAC_{EEC}$ does not match the $MAC_{EEC}$ received in 445 the verification process has failed and the UE 110 may be unable to successfully complete the exemplary authentication and authorization procedure.

In 455, the AUSF 131 may send an authentication verification response to the NEF 135. In this example, the verification process was a success. Thus, the authentication verification response may indicate a successful verification process. In other embodiments, an indication that the verification process has failed or the lack of authentication verification response may indicate to the NEF 135 that authentication verification was not successful.

In 460, the NEF 135 sends an indication of the authentication verification response (e.g., success/fail) provided by the AUSF 131 to the ECS 180. Based on the verification result, the ECS 180 decides whether to accept or reject the authentication request.

In 465, the ECS 180 sends an authentication accept or authentication reject message to the UE 110 (e.g., the EEC 240). The authentication accept message may indicate that, the UE 110 is permitted to attempt to access the edge data network 170 and/or the EAS 172. The authentication reject message may indicate that the UE 110 is not permitted to attempt to access the edge data network 170 and/or the EAS 172.

Subsequent to the authentication accept message, various signaling may be performed between the UE 110 (e.g., the application client 235, the EEC 240, etc.) and the edge data network 170 (e.g., the EAS 172, the EES 174, etc.) to establish a connection that may be used to exchange application data traffic between the UE 110 and edge data network 170. To provide an example, a PDU session establishment procedure may be initiated.

Figure 4B:
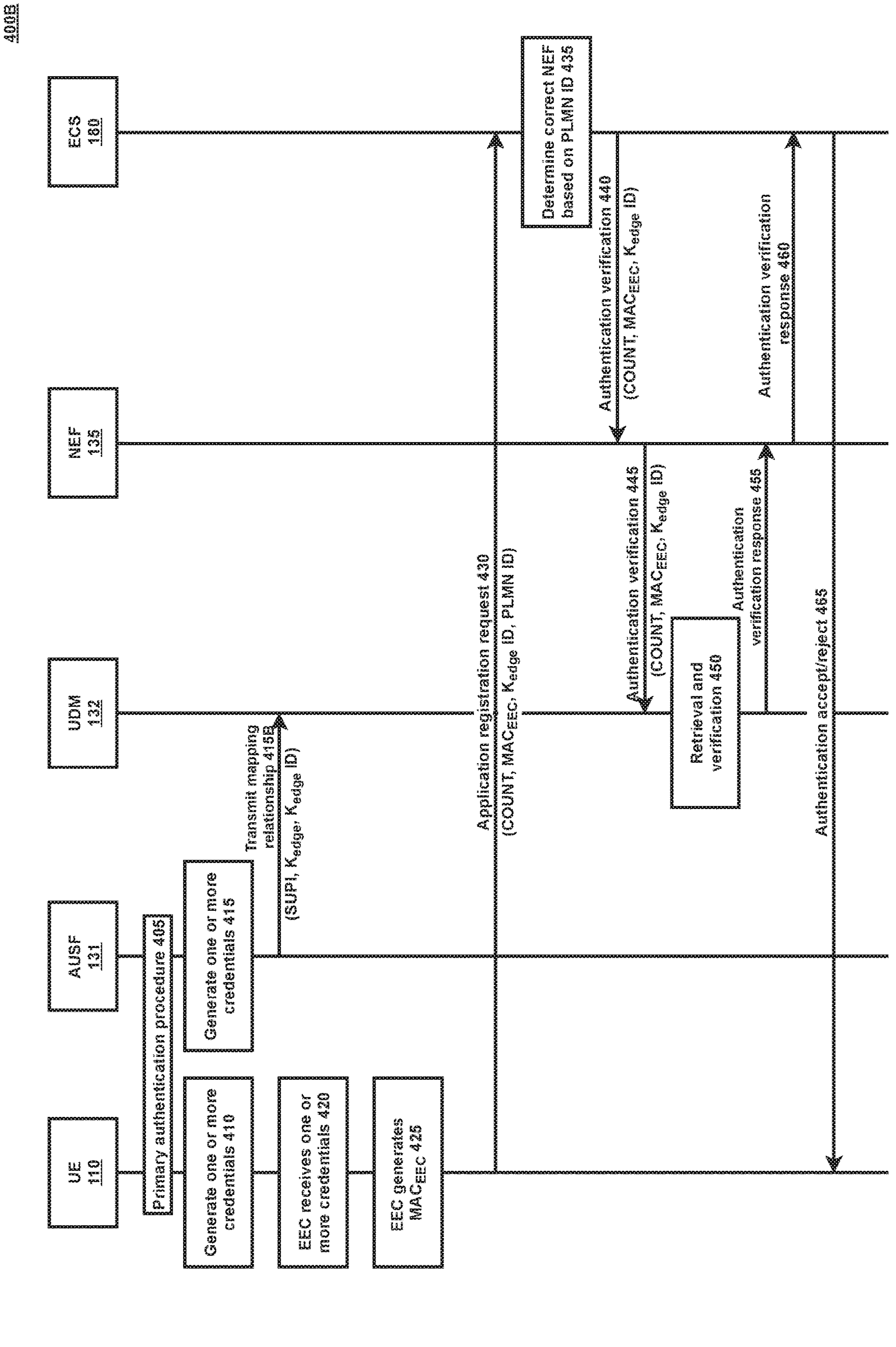

FIG. 4B shows a signaling diagram 400B for an authentication and authorization procedure according to various exemplary embodiments. The signaling diagram 400E is substantially similar to the signaling diagram 400 described above. As such, a description of identical steps will be omitted here for clarity. After generating the credentials $K_{edge}$ and $K_{edge}$ID in 415, as described above, the AUSF 131, in 415B, transmits the mapping relationship between the SUPI of the UE 110 and the credentials $K_{edge}$ and $K_{edge}$ID with the UDM 132. As such, in some embodiments, the operations described above in 445-455 may alternatively be performed by the UDM 132, as illustrated in FIG. 4B. However, in an actual operation scenario, these operations may be performed by the AUSF 131, as described above, a combination of the AUSF 131 and the UDM 132 or by any other appropriate one or more network components.

Figure 5:
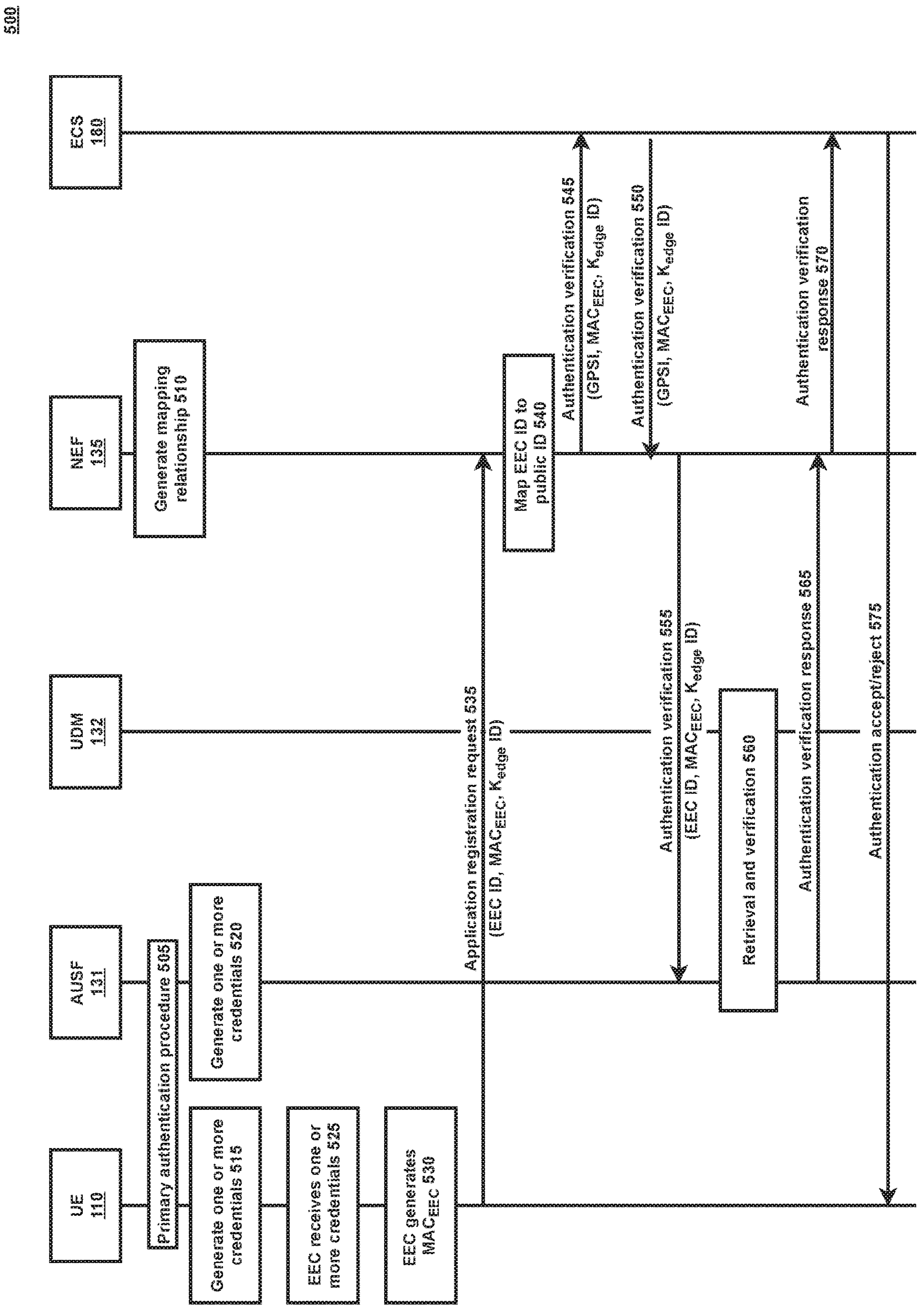
FIG. 5 shows a signaling diagram for an authentication and authorization procedure according to various exemplary embodiments.

FIG. 5 shows a signaling diagram 500 for an authentication and authorization procedure according to various exemplary embodiments. The signaling diagram 500 will be described with regard to the enabling architecture 300 of FIG. 3, the UE 110 of FIG. 2 and the network arrangement 100 of FIG. 1.

Similar to the signaling diagram 400 described above, the signaling diagram 500 includes the UE 110, the AUSF 131, the UDM 132, the NEF 135, and the ECS 180. The signaling diagram 500 also assumes that the UE 110 and the core network 130 have already successfully performed the primary authentication procedure and the credential ($K_{AUSF}$ is available. However, reference to $K_{AUSF}$ is merely provided for illustrative purposes, the exemplary embodiments may apply to any similar type of 3GPP credential or information being used in addition or instead of $K_{AUSF}$.

In addition, for the purposes of the signaling diagram 500, it may be considered that the credentials generated by primary authentication cannot be sent outside of the carrier's network. Further, it may also be considered that the UE 110 has already discovered the edge data network 170 and is permitted to initiate this exemplary edge computing authentication and authorization procedure.

In 505, the UE 110 performs primary authentication with the network. As indicated above, the procedure may result in the credential ($K_{AUSF}$) being shared between the UE 110 and the AUSF 131. However, the exemplary embodiments are not limited to the use of $K_{AUSF}$, any other appropriate parameters may be utilized.

In 510, the NEF 135 generates and stores a mapping relationship between the EEC ID of the UE 110 and the UE's public ID (e.g., SUPI, GPSI, etc.).

In 515, the UE 110 generates and stores one or more credentials. Throughout this description, these credentials may be referred to as "$K_{edge}$" and "$K_{edge}$ID." However, reference to "$K_{edge}$" and "$K_{edge}$ID" is merely for illustrative purposes, any appropriate credentials or parameters may be utilized. In this example, the credential $K_{edge}$ may be generated using a key derivation function (KDF), as previously explained above.

In 520, the AUSF 131 generates and stores one or more credentials. Here, the AUSF 131 generates the same credentials generated by the UE 110 in 515. Thus, in this example, the AUSF 131 may also generate the credentials $K_{edge}$ and $K_{edge}$ID. Since the credential $K_{AUSF}$ is shared between the UE 110 and the AUSF 131, the UE 110 and the AUSF 131 may independently generate the same credentials. However, reference to $K_{AUSF}$ is merely provided for illustrative purposes, any appropriate type of information may be used to provide the basis for the one or more credentials generated in 515 and 520.

In 525, the EEC 240 receives the one or more credentials generated by the UE 110. For example, the EEC 240 may retrieve $K_{edge}$ and $K_{edge}$ID from the memory arrangement 210 of the UE 110 or these credentials may be provided to the EEC 240 by another process executed by the processor 205.

In 530, the EEC 240 may generate a medium access control (MAC) EEC authorization parameter. Throughout this description, this parameter may be referred to as $MAC_{EEC}$. The authorization parameter may be generated using $K_{edge}$ and the EEC ID associated with the EEC 240. For example, the MAC EEC parameter may be generated using the SHA-256 hashing function. When deriving the MAC EEC parameter, P0 and P1 may be used to form the input parameter S. Here, P0 represents $K_{edge}$ and P1 represents the EEC ID. The input S may be equal to the concatenation P0|P1. The $MAC_{EEC}$ parameter is identified with the N least significant bits of the output of the SHA-246 function, e.g., 32 bits, 64 bits, etc.

In 535, the UE 110 sends an application registration request to the NEF 135. The application registration request may include information such as, but not limited to, EEC ID, $MAC_{EEC}$ and the $K_{edge}$ID. This message may be sent via non-access stratum (NAS), the user plane or in any other appropriate manner.

In 540, the NEF 135 maps the EEC ID received in the application registration request in 535 to a public ID of the UE 110 based on the mapping relationship generated in 510. In this example, the NEF 135 uses the GPSI of the UE 110. However, it should be noted that the NEF 135 may use any other public ID of the UE 110 in the mapping of the EEC ID to the public ID.

In 545, the NEF 135 sends an authentication verification message to the ECS 180 for verification. The authentication verification message may include contents similar to the application registration request (e.g., $MAC_{EEC}$ and the $K_{edge}$ID), but now includes the GPSI of the UE 110 instead of the EEC ID. As a result, the EEC ID of the UE 110 remains in the UE's MNO network and is never transmitted outside of that network, thus preventing the EEC ID from being intercepted by an attacker.

In 550, the ECS 180 sends an authentication verification message to the NEF 135 for verification. The authentication verification message may include contents similar to the authentication verification received from the NEF 135 (e.g., GPSI, $MAC_{EEC}$ and the $K_{edge}$ID).

In 555, the NEF 135 maps the GPSI in the authentication verification message received from the ECS 180 to the EEC ID of the UE to which the GPSI corresponds and sends an authentication verification message to the AUSF 131 (or UDM 132) for $MAC_{EEC}$ verification. The authentication verification message may include the resulting EEC ID, $MAC_{EEC}$ and the $K_{edge}$ID.

In 560, the AUSF 131 (and/or the UDM 132) may retrieve $K_{edge}$ using the $K_{edge}$ID and may verify the MAC EEC using the $K_{edge}$ and the EEC ID. In other words, the AUSF 131 (and/or the UDM 132) may verify the received MAC EEC by retrieving the credential generated in 410 based on its stored association to $K_{edge}$ID. The AUSF 131 (and/or the UDM 132) may then generate a second, independent and distinct, instance of $MAC_{EEC}$. If the second instance of MAC EEC matches the $MAC_{EEC}$ received in 555, the verification process is a success. In this example, the verification process is a success. However, in an actual operating scenario, if a stored instance of $K_{edge}$ cannot be found or the second instance of $MAC_{EEC}$ does not match the $MAC_{EEC}$ received in 555 the verification process has failed and the UE 110 may be unable to successfully complete the exemplary authentication and authorization procedure.

In 565, the AUSF 131 may send an authentication verification response to the NEF 135. In this example, the verification process was a success. Thus, the authentication verification response may indicate a successful verification process. In other embodiments, an indication that the verification process failed or the lack of authentication verification response may indicate to the NEF 135 that authentication verification was not successful.

The operations described above in 555-565 were described above as being performed by the AUSF 131. However, in an actual operation scenario, these operations may be performed by the UDM 132, a combination of the AUSF 131 and the UDM 132 or by any other appropriate one or more network components. For example, similar to the signaling diagram 400B described above, the AUSF 131 may send the mapping relationship between the GPSI (or SUPI) of the UE 110 and the credentials $K_{edge}$ and $K_{edge}$ID to the UDM 132 after generating the credentials $K_{edge}$ and $K_{edge}$ID in 520, as described above. As such, in some embodiments, the operations described above in. 555-565 may alternatively be performed by the UDM 132. Thus, in the signaling diagram 500, the retrieval and verification process in 560 are shown as being associated with both the AUSF 131 and the UDM 132.

In 570, the NEE 135 sends an indication of the authentication verification response (e.g., success/fail) provided by the AUSF 131 to the ECS 180. Based on the verification result, the ECS 180 decides whether to accept or reject the authentication request.

In 575, the ECS 180 sends an authentication accept or authentication reject message to the UE 110 (e.g., the EEC 240). The authentication accept message may indicate that the UE 110 is permitted to attempt to access the edge data network 170 and/or the EAS 172. The authentication reject message may indicate that the UE 110 is not permitted to attempt to access the edge data network 170 and/or the EAS 172.

Subsequent to the authentication accept message, various signaling may be performed between the UE 110 (e.g., the application client 235, the EEC 240, etc.) and the edge data network 170 (e.g., the EAS 172, the EES 174, etc.) to establish a connection that may be used to exchange application data traffic between the UE 110 and edge data network 170. To provide an example, a PDU session establishment procedure may be initiated.

EXAMPLES

In a first example, a network component implementing an authentication server function (AUSF) of a core network includes one or more processors configured to perform operations comprising generating a first credential based on a second credential, the second credential generated for a procedure between the UE and a cellular network, generating an identifier corresponding to the first credential, receiving an authentication verification message including a count, a message authentication code, and the identifier corresponding to the first credential from a network exposure function (NEF), determining the first credential based on the identifier corresponding to the first credential received from the NEF, verifying the message authentication code using the first credential and the count, and transmitting an authentication accept message or an authentication reject message to the NEF based on the verification of the message authentication code.

In a second example, the network component of the first example, wherein the first credential is based on a $K_{AUSF}$ credential and the identifier associated with the UE.

In a third example, the network component of the second example, wherein the identifier associated with the UE is one of a subscription permanent identifier (SUPI) or a generic public subscription identifier (GPSI).

In a fourth example, the network component of the first example, wherein the message authentication code is based on the first credential and the count.

In a fifth example, the network component of the first example, wherein verifying the message authentication code comprises retrieving the first credential received from the AUSF, generating a second message authentication code based on the first credential and the count, wherein the second message authentication code is independent of the message authentication code received from the NEF, and comparing the second message authentication code to the received from the NEF.

In a sixth example, the network component of the first example, wherein the count corresponds to an identifier associated with an edge network client running on the UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
- a transceiver configured to communicate with a network; and
- a processor communicatively coupled to the transceiver and configured to perform operations comprising:
  - generating a first credential based on a second credential, the second credential generated for a procedure between the UE and a cellular network;
  - generating an identifier corresponding to the first credential;
  - generating a message authentication code based on the first credential and a count, wherein the count is associated with an identifier of an edge network client running on the UE;
  - transmitting an application registration request message to a server associated with an edge data network, the application registration request message including the count, the message authentication code, the identifier corresponding to the first credential, and a public land mobile network identifier (PLMN ID) of the network; and
  - receiving an authentication accept message or an authentication reject message from the server associated with the edge data network.

2. The UE of claim 1, wherein the second credential is generated for a primary authentication procedure including an authentication server function (AUSF), and wherein the second credential is $K_{AUSF}$.

3. The UE of claim 1, wherein the first credential is further based on an identifier associated with the UE or other shared information between the UE and the cellular network.

4. The UE of claim 3, wherein the identifier associated with the UE is one of a subscription permanent identifier (SUPT) or a generic public subscription identifier (GPSI).

5. The UE of claim 1, wherein the operations further comprise:
- generating a mapping relationship between the count and the identifier associated with the edge network client.

6. The UE of claim 5, wherein the UE stores a plurality of identifiers associated with the edge network client, and wherein the count is a corresponding plurality of counts, and wherein the operations further comprise:
- generating mapping relationships between each of the plurality of counts and each of the plurality of identifiers associated with the edge network client.

7. The UE of claim 6, wherein the operations further comprise:
- generating a new count for each of the plurality of counts that has been utilized a predetermined number of times; and
- updating the mapping relationship between the plurality of counts and the plurality of identifiers associated with the edge network client to include the new count.

8. The UE of claim 1, wherein the server associated with the edge data network is an edge configuration server (ECS).

* * * * *